Sept. 8, 1959 — C. H. NEWMAN — 2,903,163
AUTOMATIC COFFEE MAKER
Filed April 3, 1957 — 3 Sheets-Sheet 1

Inventor
Charles H. Newman
By Louis Beruat
Attorney

Inventor
Charles H. Newman
By Louis Bernat
Attorney

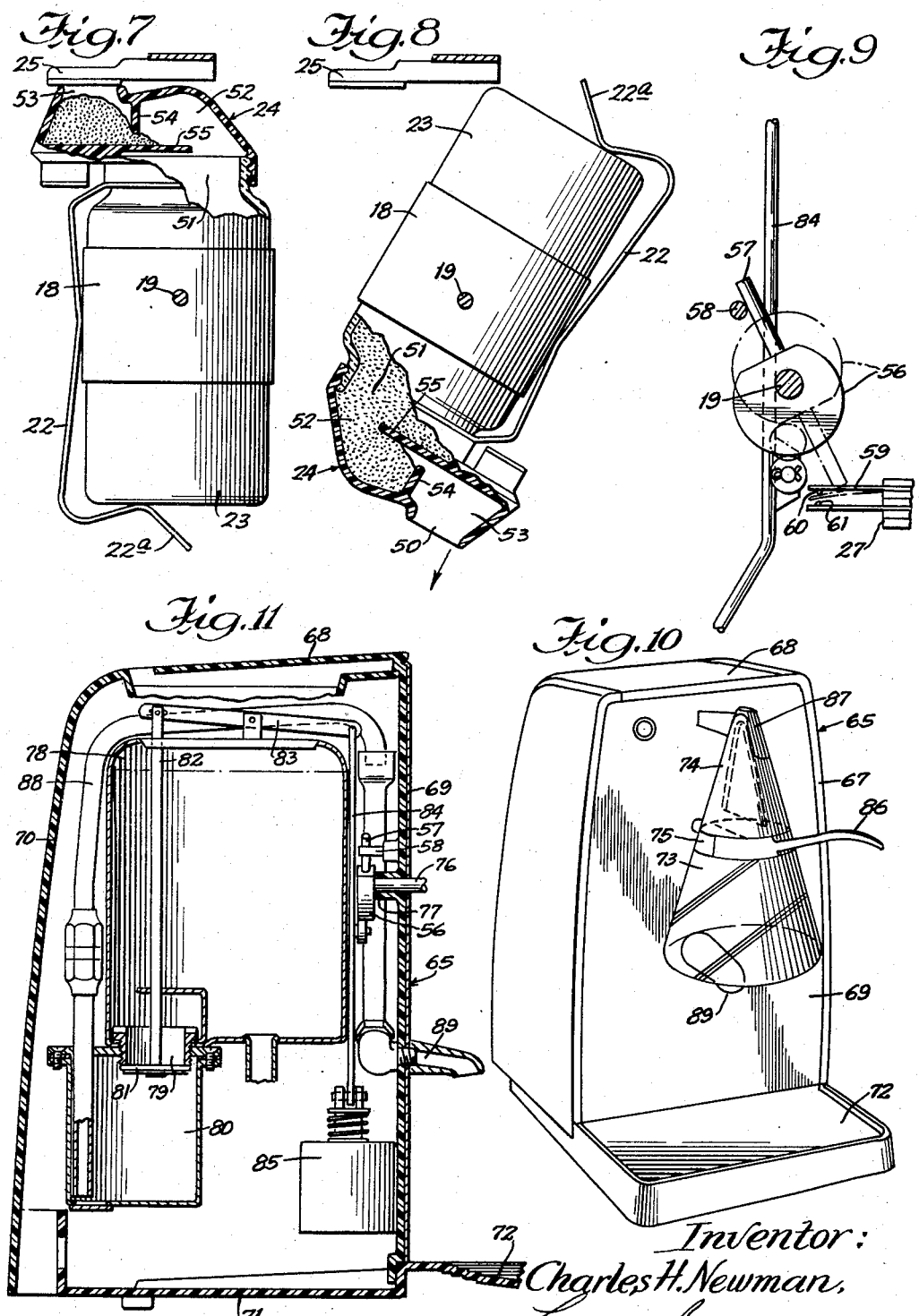

United States Patent Office 2,903,163
Patented Sept. 8, 1959

2,903,163

AUTOMATIC COFFEE MAKER

Charles H. Newman, Northfield, Ill.

Application April 3, 1957, Serial No. 650,536

8 Claims. (Cl. 222—129.4)

The present invention relates to an instant coffee maker, and more particularly to a rapid automatic individual cup coffee maker for home or industrial use.

This is a continuation-in-part of my application, Serial No. 458,466, filed September 27, 1954, now abandoned.

Heretofore various automatic coffee makers have been built for coin operated use. Such coffee makers, however, require a skilled serviceman to periodically restock the machine with the necessary materials, such as cups, coffee and powdered cream. Such devices are relatively large and expensive and are not suited for many locations. Some device, which operates on the general principle of the coin operating vending machine for hot beverage, would be highly desirable on aircrafts, ships, offices, filling stations, garages and homes. It, therefore, would be desirable to devise an individual cup coffee maker to fulfill these needs.

For use in the home there have been numerous attempts in making automatic coffee makers. The more common type operates on the percolator principle, and a suitable mechanism is embodied which will percolate the coffee for a predetermined time and thereafter maintain the coffee at a certain temperature. Such devices, however, do not make good coffee in small quantities as usually the minimum quantity is around four cups. Thus, such devices are not at all suitable for apartments and small homes where the consumption of coffee is not as great as four cups. Such devices further have the disadvantage of requiring the coffee grounds to be emptied and the interior to be thoroughly cleaned after each use. It, therefore, becomes apparent that it would be desirable to provide some other device which would overcome some of the disadvantages now inherent in the automatic coffee makers available at the present time on the market.

It, therefore, is an object of the present invention to provide a rapid, automatic individual cup coffee maker suitable for home and for industrial use.

It is a further object of the present invention to provide a rapid, automatic individual cup coffee maker for receiving commercial instant coffee containers or jars, thus obviating the need to discharge their contents.

Still another object of the invention is to provide a rapid coffee maker for home use having a greater speed of operation than automatic coffee makers now available, and one which will not require any emptying of coffee grounds or require periodic washing.

These and other objects of the invention subsequently will become apparent by reference to the following description taken in conjunction with the accompanying drawings, wherein:

Figures 7 and 8 are views illustrating the operation of one embodiment of dispensing cover utilized in the invention with portions broken away to show the internal construction;

Figure 9 is a view illustrating a preferred switch operating mechanism for the electrical circuit in accordance with the invention;

Figure 10 is a perspective view of still another illustrative coffee maker embodying the invention; and Figure 11 is a side elevational view in cross section of the coffee maker shown in Figure 10.

In accordance with the present invention it is proposed to construct a device for the rapid automatic preparation of an individual cup of coffee. While this might be the primary utility of the device, it, of course, will be apparent that the same device may be used for the preparation of instant Postum, instant cocoa, or instant soup. Hence any limitation in the specification or the claims by the use of the term "instant coffee" is intended not to be so narrow as to exclude these other mentioned instant beverages such as Postum, cocoa, soup and the like.

Figure 1:
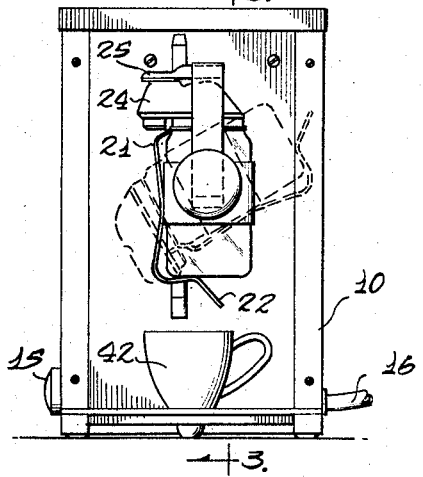
Figure 1 is a full elevational view of an individual cup coffee maker constructed in accordance with one embodiment of the present invention.
Figure 2:
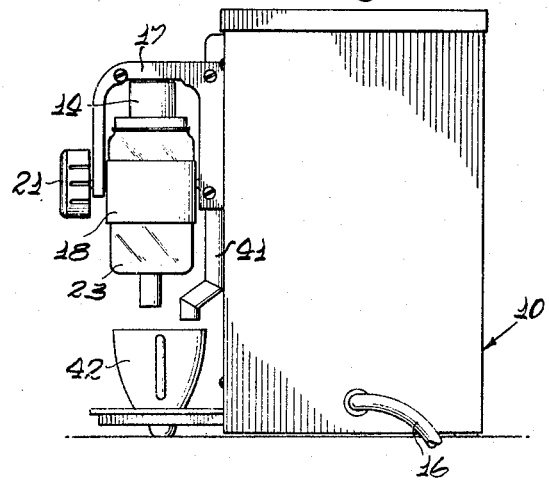
Figure 2 is a side elevational view of a coffee maker shown in Figure 1.
Figure 3:
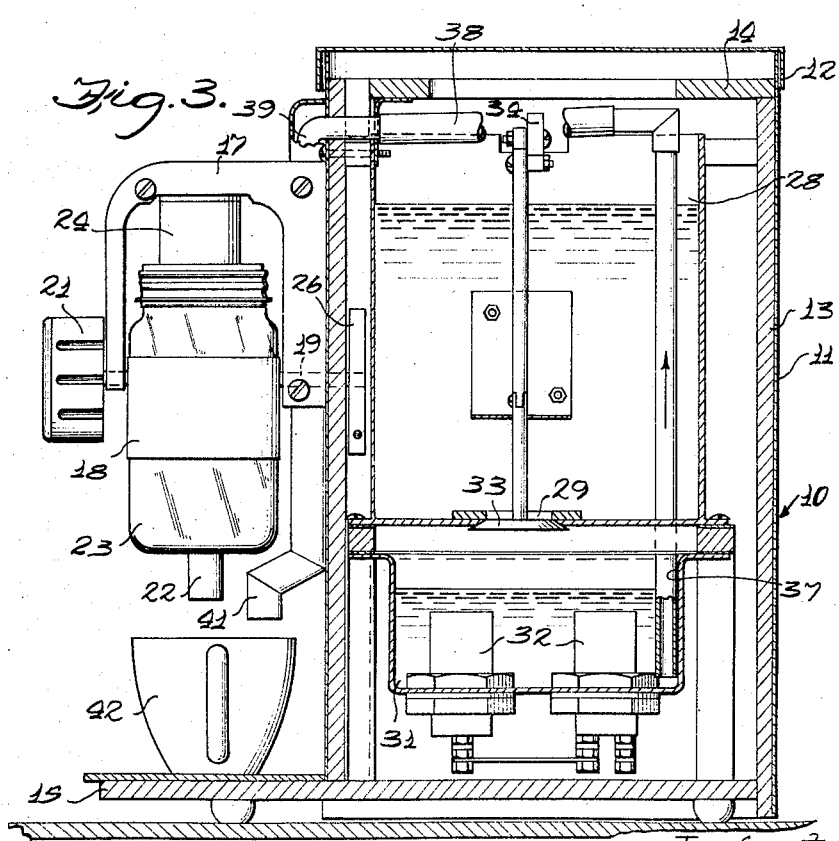
Figure 3 is a right side elevational view of the coffee maker shown in Figure 1 with portion thereof shown in cross section.

Figures 1, 2 and 3 of the drawing show one illustrative embodiment of coffee maker, in accordance with the present invention being contained in a housing or cabinet 10, which is clearly illustrated in Figure 3, comprising an external metal covering 11, a metal cover 12, and insulated structure members such as the walls 13, a top 14, and a bottom 15. At the front of cabinet 10 there is provided a bezel of a signal lamp 15 which is illuminated during each cycle of operation of the coffee maker. The coffee maker is energized by electricity which is provided through conventional electric power cord 16, which in the drawing is shown as entering the right side of cabinet 10.

At the front of cabinet 10 there is a U shaped frame 17 extending outwardly from the cabinet and carrying a pivoted support 18 journaled on shaft 19. Shaft 19 is provided at one end thereof with a manual control knob 21. The other end of shaft 19 is rotatably mounted within the cabinet 10. The pivoted support 18 carries an elongated metal strip 22, best seen in Figures 4, 5, 7, and 8, which at its upper end serves to engage the rim at the neck of a commercial glass instant coffee container 23 so that it will be in proper operating position with respect to the rest of the apparatus as described in greater detail herein below.

The lower end 22a of the strip 22 serves as a limit stop so that the pivoted support 18 may only be rotated through a pre-determined angle. Thus, when the manual control knob 21 is rotated, the instant coffee container 23 also is rotated until the lower end 22a of strip 22 strikes the upper horizontal portion of the U shaped frame 17. Accordingly, it will be appreciated that the elongated metal strip 22 cooperates with the U shaped frame 17 to limit the rotation of coffee container 23 to approximately 180° for each operation of manual control knob 21.

Advantageously, the top of the instant coffee container 23 is provided with a dispensing cover 24 having dispensing opening 50 adapted to be normally closed by a closure member 25 when the instant coffee container 23 is in its non-dispensing position. This can be clearly seen, for example, in Figures 1, 7, and 8 of the drawing. Dispensing cover 24 measures and dispenses a certain quantity of instant coffee sufficient for making one cup of beverage each time the manual control knob 21 is given a rotation of approximately 180°.

In accordance with one illustrative embodiment of this invention, this result is attained by a dispensing cover 24, having the construction shown in greater detail in Figures 7 and 8 of the drawing. Advantageously, dispensing cover 24 is provided with an opening 51 having an internal thread 52 to the end that the dispensing cover 24 may be screwed on to the neck of the instant coffee container 23. Dispensing cover 24 is divided into two chambers, storage chamber 52 and dispensing chamber 53, by means of a dividing wall 54 depending from the top of the cover. A horizontal shelf 55 extends from one side of cover 24 to block approximately ½ of the opening 51 to the end that when the instant coffee container 23 is inverted, as shown in Figure 8, the instant coffee from the container is caused to flow into chamber 52. When container 23 is returned to its normal non-dispensing position, the instant coffee in chamber 52 is partially retained by the extending horizontal shelf 55 so that when the container 23 is once again rotated to its dispensing position, a quantity of instant coffee sufficient for making one cup of beverage is dispensed through the opening 50, while at the same time additional instant coffee from container 23 drops into the storage chamber 52. Thus, it will be appreciated that each operation of container 23 by the manual control knob 21, causes a pre-determined quantity of instant coffee to be dispensed from the chamber 53 of dispensing cover 24, and at the same time an additional quantity of coffee for the next dispensing operation is supplied to chamber 52 of dispensing cover 24. It will be appreciated by those skilled in the art, that dispensing covers having other constructions suitable for dispensing a pre-determined quantity of instant coffee may be used in the invention in the place of dispensing cover 24.

The pivoted support 18 is biased toward the normal or non-dispensing position by suitable spring 26 as shown in Fgure 3 of the drawing. Immediately in back of spring 26 is a cam member 56 which serves to close an electric switch 27 shown in Figures 4 and 9 and schematically shown in the circuit diagram of Figure 6. In an illustrative embodiment of the invention as shown in greater detail in Figure 9, the cam 56 has affixed thereto a pin 57 which normally rests against a limit stop member 58 when the instant coffee container 23 is in the non-dispensing position. Upon rotation of control knob 21, and consequently shaft 19 and cam 56 affixed to shaft 19, pin 57 is brought into contact with switch blade 59 of switch 27 to close contacts 60 and 61 of the switch. The closing of switch 27 for the short interval of time required to empty a predetermined quantity of instant coffee from the dispensing cover 24 initiates a cycle of operation as subsequently will be described.

Within the cabinet 10 there is located a water reservoir 28 which is connected by a valve opening 29 to a closed water boiling chamber 31. The boiling chamber 31 is provided with one or more immersion heaters 32 with sufficient thermal capacity to heat a cup of water in less than a minute. A second cup of coffee may be heated after the first in about half that time. Thus, with the present device, it is possible to make eight cups of coffee in substantially less than half the time required for any automatic coffee maker now available for home use.

Figures 4, 5:
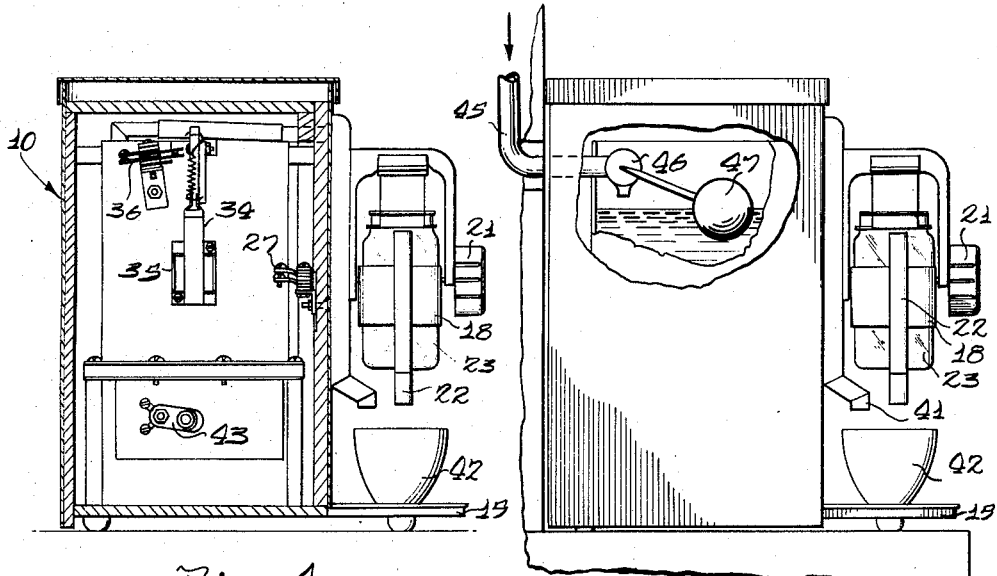
Figure 4 is a left side elevational view of the coffee maker shown in Figure 1 with the side wall removed to show the internal construction.
Figure 5 is a left side elevational view of another embodiment of the invention with a portion of the wall broken away to show the internal construction.

The valve opening 29 between the reservoir 28 and the boiling chamber 31 is arranged to be closed by a valve 33 which is connected to a set of levers 34 which are actuated by an electromagnet or solenoid 35 shown in Figure 4. Whenever the solenoid 35 is energized, the actuation of the lever mechanism 34 also closes a normally open switch 36 which is in parallel with the manually operated switch 27 which initiates the cycle of operation. A tube 37 extends from a point adjacent the bottom of the boiling chamber 31 upwardly to a horizontal conduit or tubing 38 connected to a downwardly extending discharge pipe 39 contained within a housing 41 terminating adjacent a cup 42. The heating of the water in the boiling chamber 37 causes the water to be forced upwardly through the pipe 37 to the conduit 38 and the discharge tube 39 so that one cup of boiling water discharges into the cup 42. In one embodiment of the present invention the boiling chamber 37 had a capacity of five and one/half ounces, and the reservoir 28 has a half gallon capacity. The immersion heaters 32 were each 750 watt heaters. The boiling chamber 37 is also provided with a thermostat 43 shown in Figure 4 which opens the circuit for the heaters 32 and the solenoid 35 whenever the cup of water has been heated and discharged through the outlet 39.

If desired, the reservoir 28 may be connected to a water pipe 45 provided with a float control valve 46 having a float 47 located on the upper portion of the reservoir 28. Such arrangement shown in Figure 5, would then obviate the necessity of periodically filling the reservoir 28.

One of the particular advantages of the present device is that it directly receives in the pivoted support 18 the usual jar or can or container of instant coffee as it is available from the stores without requiring any emptying of the contents. It is only necessary to remove the lid which comes with the jar and to replace it with the measuring and dispensing cover 24. The jar readily clips into position in the pivoted support 18 and is accurately locked by the upper end of the strip 22. This is clearly shown, for example, in Figures 7 and 8. The closure 25 for the dispensing cover 24 keeps the coffee fresh and seals it against the external atmosphere. Where other materials, such as instant Postum, cocoa, soup or the like, are to be employed with the apparatus shown and described in this application, suitable other covers such as 24 may be employed having different dimensions on the inside to dispense different quantities of material as may be desired. Several cover devices 24 may be provided so as to provide a selection in the quantity of coffee to be dispensed where coffee is to be made so those who might like it weak can be accommodated, as well as those who prefer their coffee extra strong.

Figure 6:
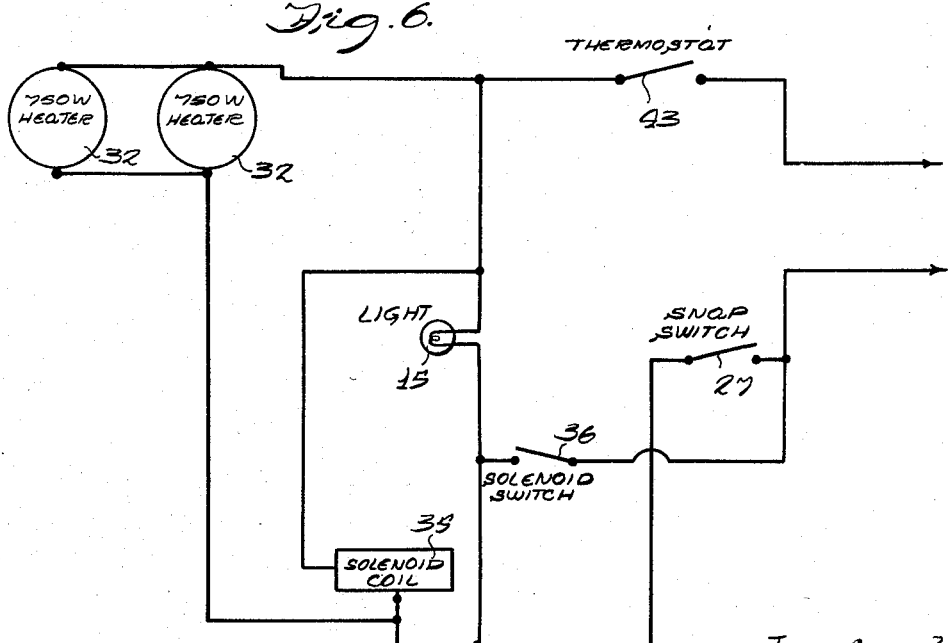
Figure 6 is a schematic circuit diagram of an illustrative embodiment of the invention.

The cycle of operation of the present device will be more readily understood by referring to Figure 6. When the knob 21 is rotated to discharge a quantity of powdered coffee into the cup 22, the cam or shaft 19 actuates the electric switch 27 which closes a circuit through the solenoid 35 and the two heaters 32. The energization of the solenoid 35 actuates the switch 36 which thereby locks in the solenoid and continues to supply current to the solenoid and the heaters even though the switch 27 subsequently is opened. During the time that the solenoid and the heaters are energized, the light 15 is energized. The thermostat 43 opens only after a certain temperature has been reached in the boiling chamber 37. This is so set that the temperature is only reached after sufficient water has been heated and discharged through the tube 41 to make a cup of beverage. When the thermostat opens up, the indicator light 15 is extinguished. When the solenoid 35 is energized, the valve 33 closes the valve opening 29 between the reservoir and the boiling chamber, so that the only place that the expanding heated water can go is up through the outlet tube 37. The force with which the boiling water passes through the outlet tube 37 and finally discharges through the housing 41 is sufficient to provide adequate mixing action in the cup.

Figure 10 and 11 of the drawing show another preferred embodiment of the invention which comprises a metal housing 65 having side walls 66 and 67, a top 68, and a front wall 69, a back wall 70, and a base 71. Preferably, base 71 is provided with a front extension 72 which advantageously may be suitably recessed for receiving a cup or other fluid holding containers. An instant coffee container 73 having a dispensing cover 74 secured thereto is supported by pivoted support 75, which in turn is mounted on a rotatable shaft 76 journaled in a bushing 77 provided at the inner surface of the front wall 69. A manually operable handle 86, which advantageously may be in the curved form shown in Figure 10, is secured to pivoted support 75 to enable container 73 and its dispensing cover 74 to be rotated through an angle of approximately 180° for dispensing a predetermined quantity of instant coffee from the dispensing cover 74 in the manner described above.

Advantageously, a closure member 87 is mounted on front wall 69 and extends forwardly therefrom for cooperative engagement with the dispensing opening of cover 74 to the end that the coffee within container 73 is sealed against the external atmosphere when the container is in the non-dispensing position.

As shown in Figure 11, the metal housing 65 has therewithin a water reservoir 78 which is connected by a valve opening 79 to a closed water boiling chamber 80. Boiling water chamber is provided with one or more immersion heaters of the type described with respect to Figure 3 to the end that a cup of water may be heated in a relatively short period of time.

The valve opening 79 between the reservoir 78 and the boiling chamber 80 is adapted to be closed by a valve 81 which is connected through a plurality of link members 82, 83, and 84 to an electromagnetic solenoid 85. In a manner similar to that described heretofore, the energization of solenoid 85 operates valve 81 to seal off boiling chamber 80 from water reservoir 78. At the same time, the heating cycle is initiated to cause the water in boiling chamber 80 to be forced upwardly through pipe 88 to the discharge conduit 89 so that one cup of boiling water is discharged into the cup positioned in extension 72 below the discharge conduit.

While for the purpose of describing and illustrating the present invention certain preferred construction have been shown, it is to be understood that the invention is not to be limited thereby since such embodiments are contemplated as may be commensurate with the spirit and scope of the invention set forth in the accompanying claims.

I claim as my invention:

1. A coffee maker comprising a water reservoir interconnected with a boiling chamber by an electromagnetic valve, an outlet pipe extending upwardly from a point adjacent the bottom of said boiling chamber to a point above said reservoir, an electric heater for the boiling chamber, a thermostat for said chamber, a manual control mechanism pivotally supporting a container of instant coffee, an instant coffee dispensing device connected to said container, a normally open power switch arranged to be closed by the actuation of said control mechanism, a holding switch connected in parallel with said power switch and responsive to the operation of said electromagnetic valve for maintaining the power circuit to the electric heater, and circuit means connecting said electromagnetic valve in parallel with said electric heater in series with said thermostat and said power switch, whereby the heating of the water in the boiling chamber to a given temperature operates the thermostat to open the power circuit and de-energize said electric heater and said electromagnetic valve.

2. An individual cup coffee maker comprising a water reservoir interconnected with a closed boiling chamber by an electromagnetic valve, an outlet pipe extending upwardly from a point adjacent the bottom of said boiling chamber to a point above said reservoir, an electric immersion heater for said chamber, a control mechanism pivotally supporting a commercial container of instant coffee, an instant coffee dispensing device connected to said container to discharge a measured quantity when pivoted, a normally open electric power switch arranged to be closed by pivoting said control mechanism, a thermostatic switch, a normally open holding switch connected in parallel with said power switch and arranged to be actuated by said electromagnetic valve, and an electric circuit connecting said electromagnetic valve in parallel with said heater and in series with said thermostatic switch, said power switch and said holding switch, whereby said electromagnetic valve and said heater are energized upon the closing of said power switch and are held energized by the closing of said holding switch until the thermostatic switch is opened to de-energize both the electromagnetic valve and the heater.

3. An individual cup coffee maker comprising a frame carrying a pivoted support for receiving a jar of instant coffee, said jar having a narrowed neck portion, a member carried by said support for supportingly engaging the neck of said jar and for limiting the rotation of said pivoted support, a coffee measuring and dispensing cover mounted on said jar, a closure member for said cover mounted on said frame, means for biasing said pivoted support to a certain position, a switch actuating member coupled to said pivoted support for rotation therewith, an electric power switch actuated by said switch actuating member whenever said pivoted support is rotated from said certain position to close a power circuit, and energizable means responsive to the actuation of said switch for heating and dispensing a predetermined quantity of water.

4. An individual cup coffee maker comprising a frame carrying a pivoted support for receiving a jar of instant coffee, said jar having a narrowed neck portion, a knob for manually rotating said support, a member carried by said support for positioning the neck of said jar and for limiting the rotation of said pivoted support, a coffee measuring and dispensing cover mounted on said jar, said cover having an opening at one side thereof, a closure member for said cover opening mounted on said frame, means for biasing said pivoted support to a certain position, an electric power switch actuated by said support to close a power circuit whenever said support is rotated from said certain position, and energizable means responsive to the actuation of said switch for automatically heating and dispensing a predetermined quantity of water.

5. An individual cup coffee maker comprising a water reservoir interconnected with a closed boiling chamber by a normally open valve, electromagnetic means for actuating said valve, an outlet pipe extending upwardly from a point adjacent the bottom of said boiling chamber, to a point above said reservoir, said chamber being arranged to discharge through said pipe a predetermined quantity of heated water, an electric immersion heater for said boiling chamber, a thermostat therefor, a manual control mechanism pivotally supporting a commercial container of instant coffee, an instant coffee dispensing device connected to said container to discharge a measured quantity when pivoted, an electric power switch arranged to be actuated by said control mechanism, a normally closed thermostatic switch, a normally open holding switch connected in parallel with said power switch and arranged to be actuated by said electromagnetic means, and an electric circuit connecting said electromagnetic means in parallel with said heater and in series with said thermostatic switch, said power switch and said holding switch, whereby said heater is energized and is held energized by the actuations of said power switch and said holding switch, respectively, until the circuit is broken by the opening of the thermostatic switch when the heated water attains a desired temperature.

6. An individual cup coffee maker comprising a frame carrying a pivoted support for a jar of instant coffee, manually operable knob means for rotating said support, a member carried by said support for positioning said jar and for limiting the rotation of said support, a coffee measuring and dispensing cover mounted on said jar and having an opening at one side thereof, a closure member for said cover mounted on said frame, means for biasing said pivoted support to a certain position, an electric switch actuated whenever said support is rotated from said certain position, and means controlled by said switch for automatically heating and dispensing a predetermined quantity of water, said means comprising a water heating chamber having an inlet and an outlet, an electric immersion heater mounted in said chamber, a valve for said inlet, and electric means controlled by said switch for closing said inlet valve and energizing said heater for a time sufficient to dispense said water through said outlet.

7. A coffee maker comprising a water reservoir, a water heating chamber located beneath said reservoir, a passage interconnecting said reservoir and said chamber, a valve for closing said passage, an electric heater for said chamber, an outlet pipe for said chamber extending above said reservoir, a pivotally supported instant coffee dispensing device, an electric switch responsive to actuation of said pivoted support to initiate a cycle of operation of said coffee maker, said switch being connected in an electric circuit including said heater, means for closing said valve and means for deenergizing said circuit after a predetermined quantity of water has been heated and discharged through said outlet pipe.

8. A coffee maker comprising a water heating chamber having an inlet provided with a valve, and an outlet comprising a pipe extending from adjacent the bottom of said chamber upwardly beyond the top thereof, an electric heater for said chamber, a pivotally mounted instant coffee dispenser, a switch actuated in response to pivotal movement of said dispenser, an electric circuit energized by said switch, said circuit including said heater and electric means for closing said inlet valve, and temperature responsive means for deenergizing said circuit.

References Cited in the file of this patent

UNITED STATES PATENTS

| | | |
|---|---|---|
| 2,614,738 | Mills | Oct. 21, 1952 |
| 2,671,575 | Hilton | Mar. 9, 1957 |